(12) United States Patent
Chari et al.

(10) Patent No.: US 11,748,480 B2
(45) Date of Patent: *Sep. 5, 2023

(54) POLICY-BASED DETECTION OF ANOMALOUS CONTROL AND DATA FLOW PATHS IN AN APPLICATION PROGRAM

(71) Applicant: Arkose Labs Holdings, Inc., San Francisco, CA (US)

(72) Inventors: Suresh Chari, Scarsdale, NY (US); Ashish Kundu, Elmsford, NY (US); Ian Michael Molloy, Westchester, NY (US); Dimitrios Pendarakis, Westport, CT (US)

(73) Assignee: Arkose Labs Holdings, Inc., San Francisco, CA (US)

( * ) Notice: Subject to any disclaimer, the term of this patent is extended or adjusted under 35 U.S.C. 154(b) by 331 days.

This patent is subject to a terminal disclaimer.

(21) Appl. No.: 17/130,582

(22) Filed: Dec. 22, 2020

(65) Prior Publication Data

US 2021/0133324 A1 May 6, 2021

Related U.S. Application Data

(63) Continuation of application No. 15/788,473, filed on Oct. 19, 2017, now Pat. No. 10,902,121.

(51) Int. Cl.
*G06F 21/00* (2013.01)
*G06F 21/56* (2013.01)
(Continued)

(52) U.S. Cl.
CPC .......... *G06F 21/566* (2013.01); *G06F 8/433* (2013.01); *G06N 7/01* (2023.01); *G06N 20/00* (2019.01); *G06F 2221/033* (2013.01)

(58) Field of Classification Search
CPC ...... G06N 20/00; G06N 7/005; G06F 21/566; G06F 2221/033; G06F 8/433
See application file for complete search history.

(56) References Cited

U.S. PATENT DOCUMENTS 6,847,979 B2   1/2005  Allemang et al.
9,306,965 B1   4/2016  Grossman et al.
(Continued)

OTHER PUBLICATIONS

Bhatkar, et al, "Dataflow anomaly detection," 2006.

*Primary Examiner* — Tri M Tran
(74) *Attorney, Agent, or Firm* — Womble Bond Dickinson (US) LLP

(57) ABSTRACT

Anomalous control and data flow paths in a program are determined by machine learning the program's normal control flow paths and data flow paths. A subset of those paths also may be determined to involve sensitive data and/or computation. Learning involves collecting events as the program executes, and associating those event with metadata related to the flows. This information is used to train the system about normal paths versus anomalous paths, and sensitive paths versus non-sensitive paths. Training leads to development of a baseline "provenance" graph, which is evaluated to determine "sensitive" control or data flows in the "normal" operation. This process is enhanced by analyzing log data collected during runtime execution of the program against a policy to assign confidence values to the control and data flows. Using these confidence values, anomalous edges and/or paths with respect to the policy are identified to generate a "program execution" provenance graph associated with the policy.

21 Claims, 4 Drawing Sheets

(51) Int. Cl.
*G06F 8/41* (2018.01)
*G06N 20/00* (2019.01)
*G06N 7/01* (2023.01)

(56) References Cited

U.S. PATENT DOCUMENTS

| | | | |
|---|---|---|---|
| 10,043,006 B2 * | 8/2018 | Puri | H04L 63/1425 |
| 2015/0271030 A1 | 9/2015 | Yaros et al. | |
| 2016/0028762 A1 * | 1/2016 | Di Pietro | H04L 63/1416 |
| | | | 726/23 |
| 2018/0018459 A1 * | 1/2018 | Zhang | G06F 21/566 |
| 2018/0225446 A1 * | 8/2018 | Liu | G06F 21/577 |

* cited by examiner

POLICY-BASED DETECTION OF ANOMALOUS CONTROL AND DATA FLOW PATHS IN AN APPLICATION PROGRAM

BACKGROUND

Technical Field

This disclosure relates generally to determining anomalous behavior in an application program, e.g., to facilitate securing the program against attack.

Background of the Related Art

Today's networks are larger and more complex than ever before, and protecting them against malicious activity is a never-ending task. Organizations seeking to safeguard their intellectual property, protect their customer identities, avoid business disruptions, and the like, need to do more than just monitor logs and network flow data; indeed, many organizations create millions, or even billions, of events per day, and distilling that data down to a short list of priority offenses can be daunting.

Known security products include Security Incident and Event Management (SIEM) solutions, which are built upon rule-based mechanisms to evaluate observed security events. SIEM systems and methods collect, normalize and correlate available network data. One such security intelligence product of this type is IBM® QRadar® SIEM, which provides a set of platform technologies that inspect network flow data to find and classify valid hosts and servers (assets) on the network, tracking the applications, protocols, services and ports they use. The product collects, stores and analyzes this data, and it performs real-time event correlation for use in threat detection and compliance reporting and auditing. Using this platform, billions of events and flows can therefore be reduced and prioritized into a handful of actionable offenses, according to their business impact. While SIEM-based approaches provide significant advantages, the rules are either hard coded or parameterized with a threat feed with concrete indicators of compromise (IoCs). Thus, typically these solutions are able to detect only known threats, but for unknown threats, e.g., detected by means of a behavior based rule, are unable to identify root cause and assist the security analyst. Moreover, these systems can present implementation challenges, as they often rely on manual curation of any semi-structured and unstructured threat feeds, i.e., natural language text, by means of security professionals reading threat advisories and extracting IoCs.

The notion of analyzing how a program runs to evaluate potential security issues can also be performed prior to application deployment. To this end, static analysis tools and services have been developed. Static security analysis (or "static analysis" for short) solutions help organization address application (e.g., web and mobile application) vulnerabilities through a secure-by-design approach. This approach embeds security testing into the software development lifecycle itself, providing organizations with the tools they require to develop more secure code. During static analysis of the computer program, the security analysis application analyses a computer model represented by a control flow call-graph to determine whether there are potential paths (e.g., represented in the graph by an edge) that may indicate a security vulnerability that could occur during run-time execution of the computer program. Such tools attempt to simplify remediation by identifying vulnerabilities in applications prior to their deployment, generating results (reports and fix recommendations) through comprehensive scanning.

For better accuracy, it is also known to provide a hybrid (static and dynamic) approach of glass-box testing that involves both run-time analysis, also known as integrated application security testing, with static taint analysis. A representative commercial offering of this type is IBM® Security AppScan®.

Generalizing, when a program runs, it may exhibit anomalous behaviors. There remains a need to provide enhanced techniques to determine and address the cause of such anomalies.

BRIEF SUMMARY

According to this disclosure, anomalous control and data flow paths in an application program (such as a distributed application) are determining by learning (e.g., using machine learning ML) the normal control flow paths and data flow paths in the program. A set of paths are termed as "normal" if such paths are part of a normal execution of the program; a normal execution of the program refers to an execution that is not compromised (in any material way) with security attacks. Further, during this learning process, and with respect to the control and data flow paths, a subset of those paths may be determined to be sensitive to the extent they involve sensitive data and/or computation.

Preferably, the learning is carried out as follows. First, data about the program's execution is collected by instrumenting the program and monitoring events in the program as it executes (preferably over multiple invocations), and recording the events with metadata related to control flow or data flow. Second, and during a training phase, this information is used to train the system about normal paths versus anomalous paths, and sensitive paths versus non-sensitive paths. Such training leads to development of a baseline "provenance" graph, which is evaluated to determine "sensitive" control or data flows for the application in its "normal" operation. This basic process is then enhanced by analyzing log data collected during runtime execution of the application program against one or more security, compliance or other policies to assign a set of confidence values to the control and data flows that are depicted in the baseline graph. Using these confidence values, a set of anomalous edges and/or paths with respect to the policy or policies is then identified (e.g., by identifying edges whose probability of traversal is exceeded by a given amount) to generate a program execution provenance graph that is associated with one or more of the relevant policies. The confidence values may then be updated (periodically, continuously, etc.), e.g., based on a machine learning-based validation of the detected anomalies, to thereby improve the accuracy of the graph(s).

The information about anomalous control and data flows as instantiated in the graph(s) can also be used for other purposes, e.g., aiding audit and forensic analysis, notifying interested users, entities or other automated systems, etc.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
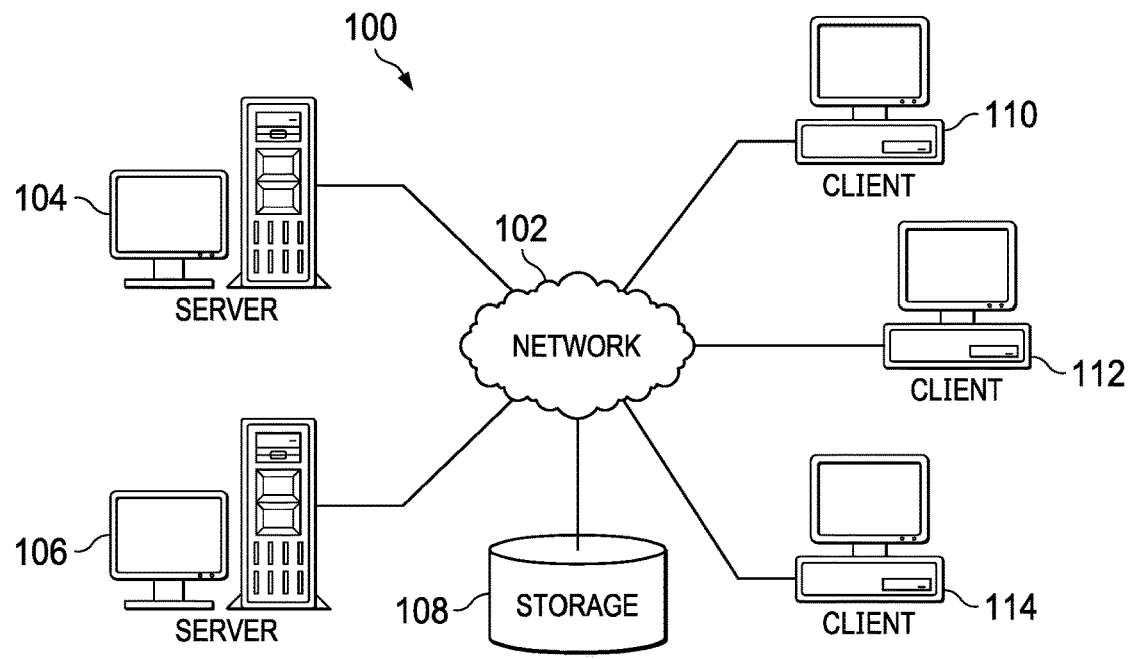
FIG. 1 depicts an exemplary block diagram of a distributed data processing environment in which exemplary aspects of the illustrative embodiments may be implemented.
Figure 2:
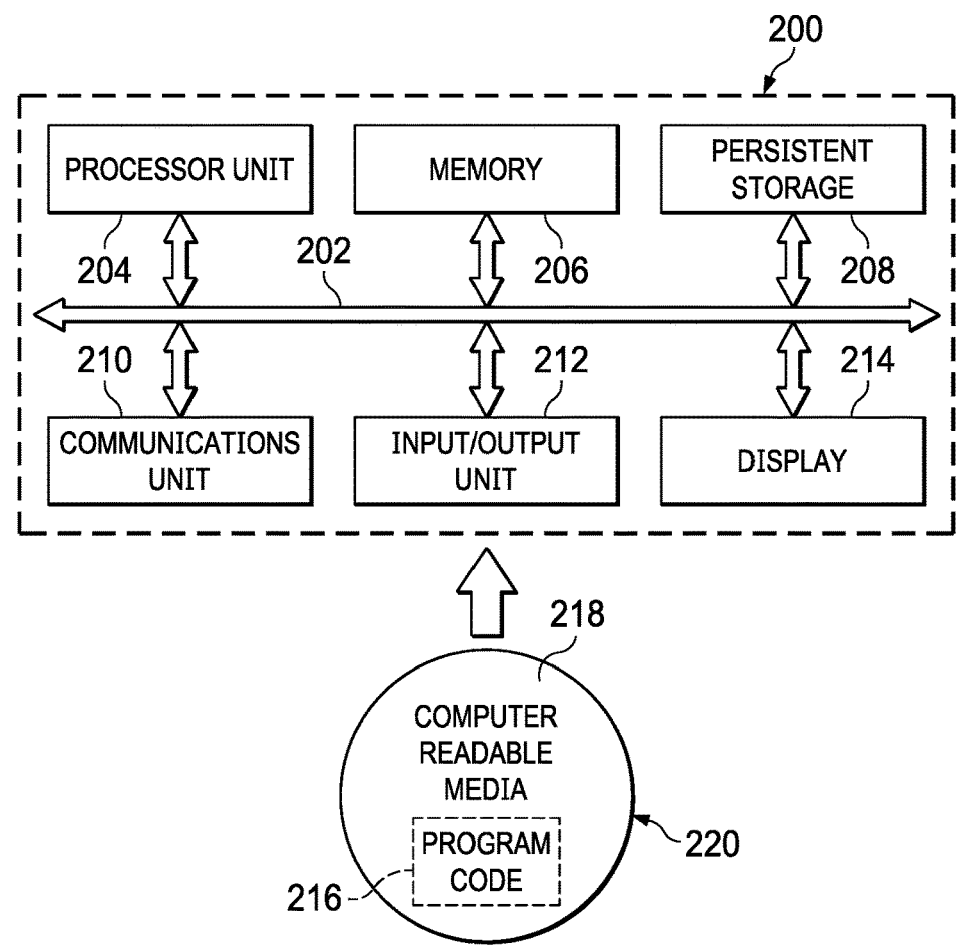
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Cloud Computing Model

An emerging information technology (IT) delivery model is cloud computing, by which shared resources, software and information are provided over the Internet to computers and other devices on-demand. Cloud computing can significantly reduce IT costs and complexities while improving workload optimization and service delivery. With this approach, an application instance can be hosted and made available from Internet-based resources that are accessible through a conventional Web browser over HTTP. An example application might be one that provides a common set of messaging functions, such as email, calendaring, contact management, and instant messaging. A user would then access the service directly over the Internet. Using this service, an enterprise would place its email, calendar and/or collaboration infrastructure in the cloud, and an end user would use an appropriate client to access his or her email, or perform a calendar operation.

Cloud compute resources are typically housed in large server farms that run one or more network applications, typically using a virtualized architecture wherein applications run inside virtual servers, or so-called "virtual machines" (VMs), that are mapped onto physical servers in a data center facility. The virtual machines typically run on top of a hypervisor, which is a control program that allocates physical resources to the virtual machines.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models, all as more particularly described and defined in "Draft NIST Working Definition of Cloud Computing" by Peter Mell and Tim Grance, dated Oct. 7, 2009.

In particular, the following are typical characteristics:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The Service Models typically are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The Deployment Models typically are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services. Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

Some clouds are based upon non-traditional IP networks. Thus, for example, a cloud may be based upon two-tier CLOS-based networks with special single layer IP routing using hashes of MAC addresses. The techniques described herein may be used in such non-traditional clouds.

Generalizing, cloud computing infrastructure provides for a virtual machine hosting environment that comprises host machines (e.g., servers or like physical machine computing devices) connected via a network and one or more management servers. Typically, the physical servers are each adapted to dynamically provide one or more virtual machines using virtualization technology, such as VMware ESX/ESXi. Multiple VMs can be placed into a single host machine and share the host machine's CPU, memory and other resources, thereby increasing the utilization of an organization's data center. Among other tasks, the management server monitors the infrastructure and automatically manipulates the VM placement as needed, e.g., by moving virtual machines between hosts. In a non-limiting implementation, representative platform technologies of this type are, without limitation, IBM System x® servers with VMware vSphere 4.1 Update 1 and 5.0.

Security Intelligence Platform with Incident Forensics

Figure 3:
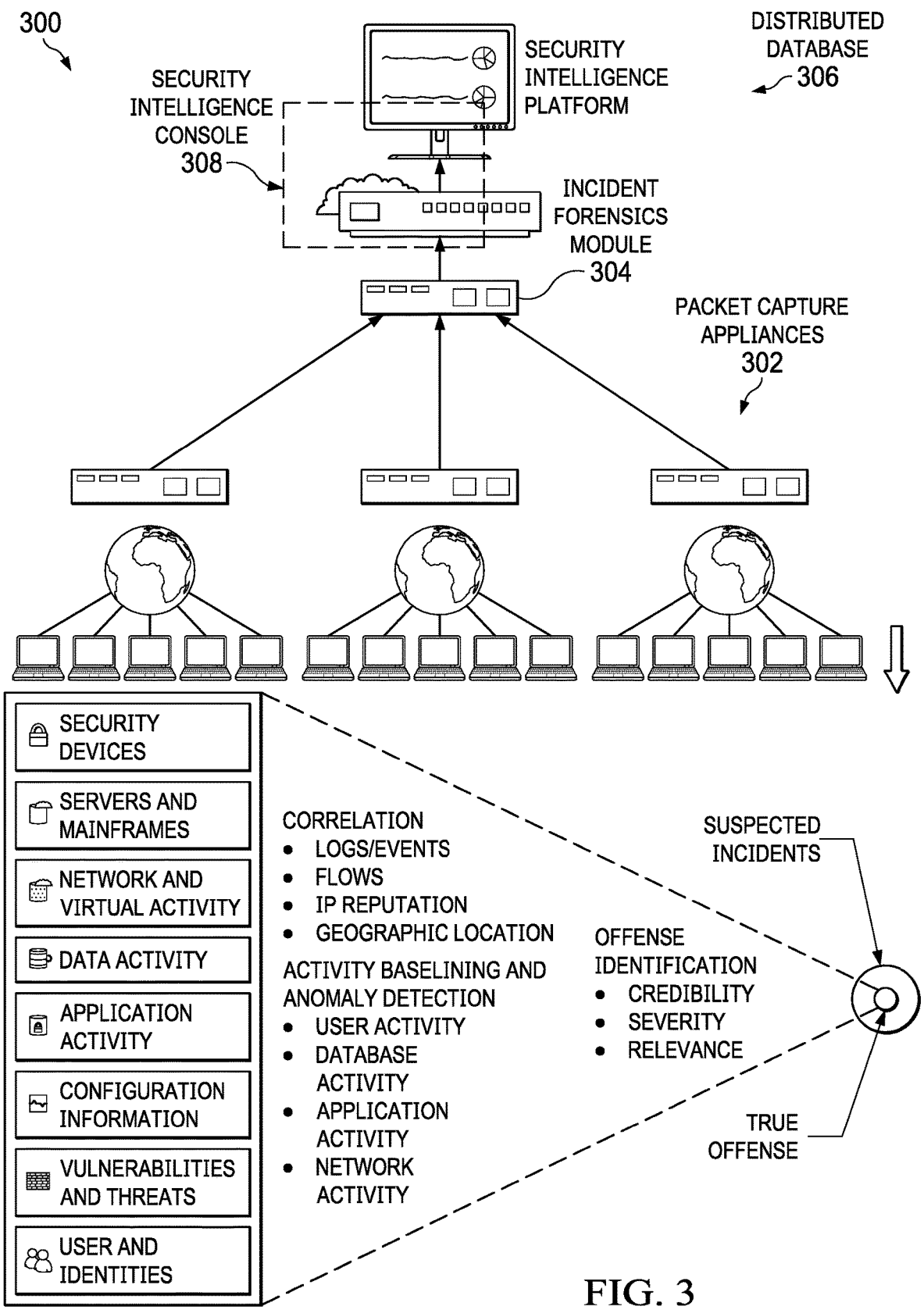
FIG. 3 illustrates a security intelligence platform in which the techniques of this disclosure may be practiced.

By way of additional background, a known security intelligence platform in which the technique of this disclosure may be practiced is illustrated in FIG. 3. Generally, the platform provides search-driven data exploration, session reconstruction, and forensics intelligence to assist security incident investigations. In pertinent part, the platform 300 comprises a set of packet capture appliances 302, an incident forensics module appliance 304, a distributed database 306, and a security intelligence console 308. The packet capture and module appliances are configured as network appliances, or they may be configured as virtual appliances. The packet capture appliances 302 are operative to capture packets off the network (using known packet capture (pcap) application programming interfaces (APIs) or other known techniques), and to provide such data (e.g., real-time log event and network flow) to the distributed database 306, where the data is stored and available for analysis by the forensics module 304 and the security intelligence console 308. A packet capture appliance operates in a session-oriented manner, capturing all packets in a flow, and indexing metadata and payloads to enable fast search-driven data exploration. The database 306 provides a forensics repository, which distributed and heterogeneous data sets comprising the information collected by the packet capture appliances. The console 308 provides a web- or cloud-accessible user interface (UI) that exposes a "Forensics" dashboard tab to facilitate an incident investigation workflow by an investigator. Using the dashboard, an investigator selects a security incident. The incident forensics module 304 retrieves all the packets (including metadata, payloads, etc.) for a selected security incident and reconstructs the session for analysis. A representative commercial product that implements an incident investigation workflow of this type is IBM® Security QRadar® Incident Forensics V7.2.3 (or higher). Using this platform, an investigator searches across the distributed and heterogeneous data sets stored in the database, and receives a unified search results list. The search results may be merged in a grid, and they can be visualized in a "digital impression" tool so that the user can explore relationships between identities.

In particular, a typical incident forensics investigation to extract relevant data from network traffic and documents in the forensic repository is now described. According to this approach, the platform enables a simple, high-level approach of searching and bookmarking many records at first, and then enables the investigator to focus on the bookmarked records to identify a final set of records. In a typical workflow, an investigator determines which material is relevant. He or she then uses that material to prove a hypothesis or "case" to develop new leads that can be followed up by using other methods in an existing case. Typically, the investigator focuses his or her investigation through course-grained actions at first, and then proceeds to fine-tune those findings into a relevant final result set. The bottom portion of FIG. 3 illustrates this basic workflow. Visualization and analysis tools in the platform may then be used to manually and automatically assess the results for relevance. The relevant records can be printed, exported, or submitted processing.

As noted above, the platform console provides a user interface to facilitate this workflow. Thus, for example, the platform provides a search results page as a default page on an interface display tab. Investigators use the search results to search for and access documents. The investigator can use other tools to further the investigation. One of these tools is a digital impression tool. A digital impression is a compiled set of associations and relationships that identify an identity trail. Digital impressions reconstruct network relationships to help reveal the identity of an attacking entity, how it communicates, and what it communicates with. Known entities or persons that are found in the network traffic and documents are automatically tagged. The forensics incident module 304 is operative to correlate tagged identifiers that interacted with each other to produce a digital impression. The collection relationships in a digital impression report represent a continuously-collected electronic presence that is associated with an attacker, or a network-related entity, or any digital impression metadata term. Using the tool, investigators can click any tagged digital impression identifier that is associated with a document. The resulting digital impression report is then listed in tabular format and is organized by identifier type.

Generalizing, a digital impression reconstructs network relationships to help the investigator identify an attacking entity and other entities that it communicates with. A security intelligence platform includes a forensics incident module that is operative to correlate tagged identifiers that interacted with each other to produce a digital impression. The collection relationships in a digital impression report represent a continuously-collected electronic presence that is associated with an attacker, or a network-related entity, or any digital impression metadata term. Using the tool, investigators can click any tagged digital impression identifier that is associated with a document. The resulting digital impression report is then listed in tabular format and is organized by identifier type.

Typically, an appliance for use in the above-described system is implemented is implemented as a network-connected, non-display device. For example, appliances built purposely for performing traditional middleware service oriented architecture (SOA) functions are prevalent across certain computer environments. SOA middleware appliances may simplify, help secure or accelerate XML and Web services deployments while extending an existing SOA infrastructure across an enterprise. The utilization of middleware-purposed hardware and a lightweight middleware stack can address the performance burden experienced by conventional software solutions. In addition, the appliance form-factor provides a secure, consumable packaging for implementing middleware SOA functions. One particular advantage that these types of devices provide is to offload processing from back-end systems. A network appliance of this type typically is a rack-mounted device. The device includes physical security that enables the appliance to serve as a secure vault for sensitive information. Typically, the appliance is manufactured, pre-loaded with software, and then deployed within or in association with an enterprise or other network operating environment; alternatively, the box may be positioned locally and then provisioned with standard or customized middleware virtual images that can be securely deployed and managed, e.g., within a private or an on premise cloud computing environment. The appliance may include hardware and firmware cryptographic support, possibly to encrypt data on hard disk. No users, including administrative users, can access any data on physical disk. In particular, preferably the operating system (e.g., Linux) locks down the root account and does not provide a command shell, and the user does not have file system access. Typically, the appliance does not include a display device, a CD or other optical drive, or any USB, Firewire or other ports to enable devices to be connected thereto. It is designed to be a sealed and secure environment with limited accessibility and then only be authenticated and authorized individuals.

An appliance of this type can facilitate Security Information Event Management (SIEM). For example, and as noted above, IBM® Security QRadar® STEM is an enterprise solution that includes packet data capture appliances that may be configured as appliances of this type. Such a device is operative, for example, to capture real-time Layer 4 network flow data from which Layer 7 application payloads may then be analyzed, e.g., using deep packet inspection and other technologies. It provides situational awareness and compliance support using a combination of flow-based network knowledge, security event correlation, and asset-based vulnerability assessment. In a basic QRadar SIEM installation, the system such as shown in FIG. 3 is configured to collect event and flow data, and generate reports. As noted, a user (e.g., an SOC analyst) can investigate offenses to determine the root cause of a network issue.

Generalizing, Security Information and Event Management (SIEM) tools provide a range of services for analyzing, managing, monitoring, and reporting on IT security events and vulnerabilities. Such services typically include collection of events regarding monitored accesses and unexpected occurrences across the data network, and analyzing them in a correlative context to determine their contribution to profiled higher-order security events. They may also include analysis of firewall configurations, network topology and connection visualization tools for viewing current and potential network traffic patterns, correlation of asset vulnerabilities with network configuration and traffic to identify active attack paths and high-risk assets, and support of policy compliance monitoring of network traffic, topology and vulnerability exposures. Some SIEM tools have the ability to build up a topology of managed network devices such as routers, firewalls, and switches based on a transformational analysis of device configurations processed through a common network information model. The result is a locational organization which can be used for simulations of security threats, operational analyses of firewall filters, and other applications. The primary device criteria, however, are entirely network- and network-configuration based. While there are a number of ways to launch a discovery capability for managed assets/systems, and while containment in the user interface is semi-automatically managed (that is, an approach through the user interface that allows for semi-automated, human-input-based placements with the topology, and its display and formatting, being data-driven based upon the discovery of both initial configurations and changes/deletions in the underlying network), nothing is provided in terms of placement analytics that produce fully-automated placement analyses and suggestions.

Generalizing, any analytics function such as described above may be performed locally as a standalone application using the data processing system in FIG. 2, as the target of a client-server architecture as in FIG. 1, or remotely as a cloud application.

Determining Anomalous and Sensitive Control- and Data-Flow in an Application

With the above as background, the techniques of this disclosure are now described. As will be seen, the approach herein provides for dynamic analysis of an application program running in a machine or across a set of machines in an execution environment. The particular nature of the application program is not a limitation, and application itself may be operated in a standalone manner or, more commonly, as a distributed application. Thus, the application program includes program code that is executed in a run-time environment in any type of computing environment, such as described above. A typical implementation, although non-limiting, is a distributed application running as x86 code in a cloud computing environment. According to this disclosure, a method is provided to identify security vulnerabilities in the application program that result from anomalous control flow paths, and which may be the result of bugs, or attacks including, e.g., return-oriented programming attacks.

Generally, anomalous control and data flow paths in an application program are determined by machine learning the program's normal control flow paths and data flow paths. A set of paths are termed as "normal" if such paths are part of a normal execution of the program. A normal execution of the program refers to an execution that is not compromised (in any material way), e.g., by security attacks. Further, and with respect to the control and data flow paths, a subset of those paths may be determined to be sensitive if they are determined to involve sensitive data and/or computation.

Preferably, the learning as described above is carried out as follows. First, data about the program's execution is collected by instrumenting the program and monitoring events in the program as it executes (preferably over multiple invocations), and recording the events with metadata related to control flow or data flow. Second, and during a training phase, this collected information is used to train the system about normal paths versus anomalous paths, and sensitive paths versus non-sensitive paths. As will be seen, such training leads to development of a baseline "provenance" graph, which is evaluated to determine "sensitive" control or data flows for the application in its "normal" operation. This basic process is then enhanced by analyzing log data collected during runtime execution of the application program against one or more security, compliance or other policies to assign a set of confidence values to the control and data flows that are depicted in the baseline provenance graph. Using these confidence values, a set of anomalous edges and/or paths with respect to the policy or policies is then identified to generate a "program execution" provenance graph that is associated with one or more of the relevant policies. The confidence values may then be updated (periodically, continuously, etc.), e.g., based on a machine learning-based validation of the detected anomalies, to thereby improve the accuracy of the graph(s). Based on the confidence values, a path is classified to be anomalous if a confidence value for anomaly is high (e.g., relative to a threshold, which may be configurable).

The information about anomalous control and data flows as instantiated in the graph(s) can then be used for other purposes, e.g., aiding audit and forensic analysis, notifying interested users, entities or other automated systems, etc.

Figure 4:
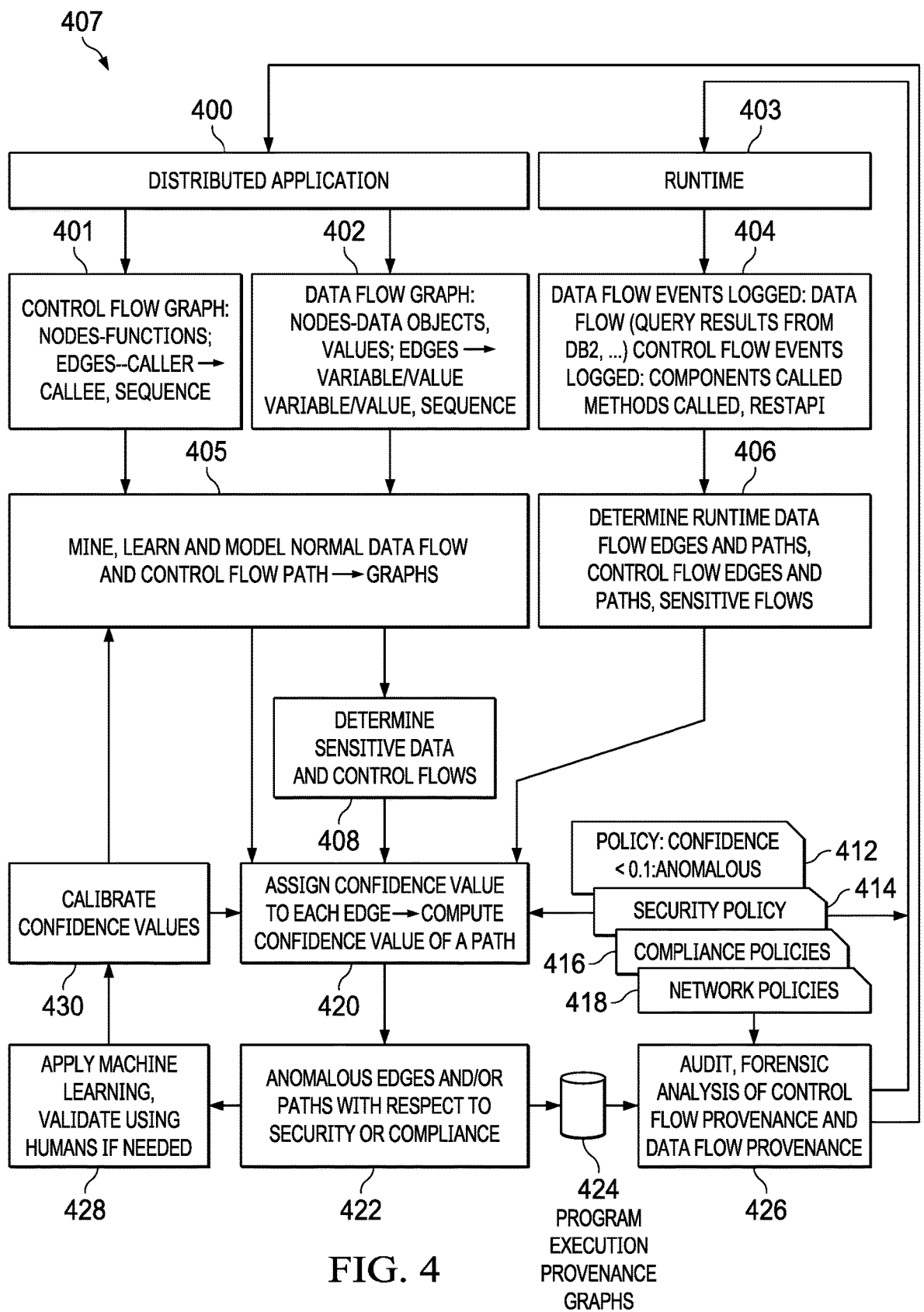
FIG. 4 depicts a high-depiction of the technique of this disclosure that provides for policy-based detection of anomalous control and data flow paths in an application.

FIG. 4 depicts the high-level learning technique as described above in additional detail. Initially, the application program 400 is configured with instrumentation 407 such that, when executed, instruction-level traces are generated (by the instrumentation). As will be described, the instruction-level traces are logged and represent control flow information for the application program. The code may be instrumented in any convenient manner (e.g., via compiler or binary modifications), and the instrumentation is added typically in an off-line process. While it is preferred to instrument the code at a very fine-grained level (to produce instruction-level traces), this is not required, as more coarse-grained instrumentation, such as instrumenting jumps, branches, and calls, etc., may also be utilized. Based on the instrumentation, a set of flow graphs are generated or built using known graph building techniques and tools. Typically, these flow graphs are generated by recording events and marking them with metadata as control flow, or data flow. Thus, for example, the metadata may annotate call graphs (e.g., to identify branches, calls, system calls, returns, indirect branches, indirect calls, etc.), identify count instructions, memory writes, the values of the EIP register (that holds the extended instruction pointer for the stack), and so forth.

Preferably, the flow graphs include two distinct flow graphs, namely, a control flow graph 401, and a data flow graph 402. In an alternative embodiment, these graphs may be integrated into a single graph.

The control flow graph 401 comprises nodes and edges, wherein the nodes of the control flow graph represent functions or instructions, and the edges thereof represent calls, or the like. Thus, an edge in the call flow graph may represent caller and callee, together with a value that represents a call sequence. The data flow graph 402 comprises nodes and edges, wherein the nodes of the data flow graph represent data objects, values, and the like, and the edges of the data flow graph represent variable/value pairs, or variable/value, sequence, or the like.

At step 404, and as the application program runtime executes (as depicted at 403), control flow events are logged, as are data flow events. A control flow event, for example, may be that a certain component called a certain method, whereas a data flow event, for example, may be that a given data flow resulted from a query to a particular database, etc. Of course, these are just representative examples, as the nature, type and syntax of the flow events may be quite varied and typically will depend on the application program.

Based on the set of flow graphs, the method continues at 405 to mine, learn and model "normal" control flow, "normal" data flow for the application program. This notion of learning "normal" behavior is sometimes referred to herein generally as "mining." As noted, a set of paths are termed as "normal" if such paths are part of a normal execution of the program, where normal execution refers to an execution that is not compromised in any material way by security attacks or other issues. The rationale for performing this step is that most application programs have many different types of behaviors, and thus the notion of what is "normal" behavior preferably is evaluated using multiple invocations of the application program, testing multiple input options and the like, with the goal of ensuring reachability of all control and data flows (represented different application program behaviors) in the call and data flow graphs. Indeed, the differences between call graphs produced from just two runs of the application program may evidence control or data flow anomalies. By applying fuzzers or other tools, by leverage unit testing, and other such known techniques, the mining process ensures that the code is fully exercised so that the "normal" traces of call graphs are obtained.

Using supervised clustering, a training classifier, or the like, the resulting call graphs generated during these multiple traces are clustered so that the system can learn which input options/parameters yield which sub-graphs, etc. Thus, step 406 as shown determines runtime data flow edges and paths, and control flow edges and paths, as well as potentially sensitive flows. Any convenient clustering algorithm (or set of algorithms) may be used for this purpose. The clusters need not be disjoint, and graph patterns (sequences or n-grams of calls) may also be clustered to improve coverage. Membership in clusters may be used for further classification, such as a one class classifier.

The machine learning that determines whether a program execution behavior is normal or anomalous is based on the data flow paths and the control paths the program takes in runtime. Whether a given anomalous behavior has a security risk is dependent on whether the information processed/generated and the computation units involved in that anomaly are known, determined or learned as sensitive. As the system learns that such information and computation units are part of a behavior and are indeed sensitive, it can tag the affected paths or flows to present a higher risk.

The machine learning may be supervised (as noted above), or unsupervised. In the supervised case, the application program is labeled with normal and anomalous paths information in a training dataset, as well as training for sensitive data (e.g., the size, and senders of that data). The model that has been trained is then tested, and the performance thereof is then tuned by further training and testing, all in a known manner. A supervised learning approach also typically includes learning with respect to behavior types based on frequency of operations, as well as controlled execution. Unsupervised learning typically depends on learning of the most frequent paths or paths that are taken often without the application program crashing or providing more output than a statistically-correlated output.

Using these techniques, the system clusters the call graphs that are generated from multiple traces to build a baseline (i.e., normal) profile for the application program. The baseline model preferably represents any invocation as a composition of base components.

Summarizing, the above-described operations typically comprise a training phase in which the baseline profile for the application program is generated. This baseline profile may be instantiated as a "normal" provenance graph (because the graph reflects how the control flows and data flows originate during normal execution). This process may be carried out continuously or periodically, synchronously or asynchronously (with respect to some other event, occurrence, or activity), and using steps or operations that may be carried out in any sequence or order.

As depicted 408, the baseline profile or graph (which typically is instantiated as a computer-implemented model) is then analyzed to facilitate detection of "sensitive" data and control flows in the application. As noted, paths may be determined to be sensitive if they are determined to involve sensitive data and/or computation. Although many different types of techniques may be used, the distinction between sensitive and non-sensitive information may be determined when the application program has been annotated with labels for the variables or data structures, and/or for the computation units such as functions and processes. Such annotations are well-known. To be able to learn automatically whether data received is sensitive, in one embodiment the system determines if the client sending the data has sent sensitive data earlier, and if so, whether a percentage of the data sent from that client is beyond a configurable threshold. When these conditions are determined to have been met, then data from such clients is labeled as sensitive. This is just a representative example of how the system discriminates sensitive versus non-sensitive information, and any other type of processing or learning may be used.

Anomalous flows are determined or detected using a graph analysis engine, which typically is implemented in software executing in a hardware processor. There are various known techniques and methodologies used to determine or detect anomalies. A particular edge in the baseline graph has a probability of being traversed, i.e., exercised (so that the edge contributes to a flow), and this probability has an associated confidence interval (representing a set of confidence values between a high end and a low end). When the probability of traversal for an edge goes beyond one of these values (e.g., the high end), and by a given amount, it is deemed an anomaly. The particular confidence interval may vary, as one may choose a higher interval (e.g., 99%) to reduce the number of false positives (in such case, to about 1%).

Other anomaly detection techniques may be applied. Thus, for example, the existence of new edges and nodes in the graph (as compared to prior runs) may be flagged as potential anomalies. To provide a concrete example, a return-oriented programming (ROP) attack may be seen as the creation of a new node (vertex), with the offsets the vertex represents being "between" the boundaries of another vertex. Traces that cannot be mapped with low error, or that are different from prior invocations, may be flagged or otherwise identified as anomalies. Using supervised clustering, the system can identify code blocks and regions that are active for a given set of functionality, such that other code regions that are not typically activated (in such context) might then be good indicators of attack (if they later are). Other activity, such as "go to" failures, may also be indicative of an anomaly or attack vector. Of course, these are just representative examples, as any convenient anomaly detection technique or approach may be used or enforced by the graph analysis engine. The graph analysis engine also typically implements graph processing techniques such as graph traversal.

After the system is trained about normal paths versus anomalous paths, and sensitive paths versus non-sensitive paths, the learning preferably is enhanced by analyzing log data collected during runtime execution of application program against one or more policies. Such policies include, without limitation, security policy, compliance policy, network policy, and so forth. This is sometimes referred to herein as a real-time execution phase. In this aspect, the method preferably makes use of dynamic log analysis, wherein logs are collected from various sources (e.g., operating system, application, middleware, network devices, etc.) as the application program runtime executes. Typical tools that produce such log information are Strace, Itrace, dtrace, systemtap, etc., and other such coarse-grained tools can be used for this purpose.

This log information (from one or more sources) may be correlated or otherwise normalized, with the resulting log events then analyzed against one or more policies, such as a security policy 414, a compliance policy 416, a network policy 418, and the like. In particular, by analyzing the log events captured with respect to the security rules, compliance rules, network rules, etc., the system then generates and assigns confidence values to each control flow or data flow path that is determined at step 406 and depicted in the baseline graph. This assignment of confidence values is depicted at step 420. A particular edge in the baseline graph has a probability of being traversed, i.e., exercised (so that the edge contributes to a flow), and this probability has an associated confidence interval (representing a set of confidence values between a high end and a low end). When the probability of traversal for an edge goes beyond one of these values (e.g., the high end), and by a given amount, it is deemed an anomaly. Stated another way, and based on the confidence values, a path is classified to be anomalous if a confidence value for anomaly is high. How "high" depends on the particular confidence interval, which may vary, as one may choose a higher interval (e.g., 99%) to reduce the number of false positives. Preferably, and as depicted in FIG. 4, the confidence values assigned at step 420 also are based on the baseline model generated during the training phase (at step 405), as well as any data and control flows that are determined therefrom (at step 406).

At step 422, the method then identifies anomalous edges or paths (with respect to the security policy, the compliance policy, the network policy, etc.) based on these confidence values. Reference numeral 412 represents a policy associated with a control or data flow over an edge that has been determined to have an anomaly. The real-time execution phase thus results in one or more program execution (runtime) provenance graphs 424 that are policy- or compliance-specific and, at step 426, these graphs may then be provided to other persons, entities or automated systems for further action or analysis, e.g., auditing, monitoring, debugging, forensics, sandboxing, or the like.

According to a further aspect of this disclosure, the confidence values (associated with the graph) are calibrated through the further interactions depicted in FIG. 4. To this end, preferably the anomalous edges and/or paths that are identified at step 422 are provided as input to step 428, which is a validation operation designed to validate whether the anomalies so detected are indeed real. Preferably, the operation at step 428 invokes one or more machine learning (ML) algorithms for this purpose. In the alternative, a human may provide the validation. Based on the validation operation, the confidence values assigned at step 420 are then adjusted or calibrated at step 430. The resulting calibrated confidence values are then supplied back to step 420 (where the confidence values are assigned), as well as to step 405, which as noted generates the baseline model. Thus, according to this disclosure, information derived from the validation operation at step 428 is used to update or adjust both the runtime provenance graph, as well as the baseline graph. This adjustment and updating of these models preferably occurs continuously or periodically so as to improve the accuracy of the system.

As noted above, preferably a graph generated herein (or information derived therefrom) is output or otherwise reported to an interested person, entity, other computing system or automation, etc. as desired. A typical output is a report or notification (e.g., of one or more detected control flow or data flow anomalies) that is provided to a user, to another system for automated response or other analysis or activity, etc.

Thus, according to this disclosure, anomalous control and data flow paths in an application program (such as a distributed application) are determining by instrumenting the program and monitoring events in the program as it executes, recording the events with metadata as control flow or data flow. During a training phase, this information is used to train the system about normal paths versus anomalous paths, and sensitive paths versus non-sensitive paths. Such training leads to development of a baseline "provenance" graph, which is evaluated to determine "sensitive" control or data flows for the application in its "normal" operation. By analyzing log data collected during runtime execution of the application program against one or more security, compliance or other policies, a set of confidence values are assigned to the control and data flows that are depicted in the baseline graph. Using these confidence values, a set of anomalous edges and/or paths with respect to the policy or policies is then identified to generate a program execution provenance graph that is associated with one or more of the relevant policies. The confidence values may then be updated, e.g., based on a machine learning-based validation of the detected anomalies, to thereby improve the accuracy of the graph(s). The information about anomalous control and data flows as instantiated in the graph(s) can then be used for other purposes, e.g., aiding audit and forensic analysis, notifying interested users, entities or other automated systems, etc.

The particular type of machine learning that may be implemented is not limited. As well-known, machine learning involves the construction of algorithms that learn from data. Such algorithms operate by building a model based on inputs, and using that model to make predictions or decisions, rather than following only explicitly programmed instructions. One categorization of machine learning tasks arises by considering the desired output of a machine-learned system. In a classification approach, inputs are divided into two or more classes, and the learner must produce a model that assigns unseen inputs to one or more of these classes. A particular ML type is decision tree learning. This type of learning uses a decision tree as a predictive model, which maps observations about an item to conclusions about the item. In the approach herein, preferably the machine learning model (the classifier used to validate particular anomalous flows) is generated and refined as needed using known machine learning tools and methods.

When the approach herein is implemented in a cloud environment, the graph(s), and any associated information about the control and data flow anomalies therein, are associated with the various cloud computing resources that facilitate execution of the application program, as an image that can be saved and further analyzed or used for other diagnostic, remediation, monitoring, management, operational or administrative purposes.

Figure 5:
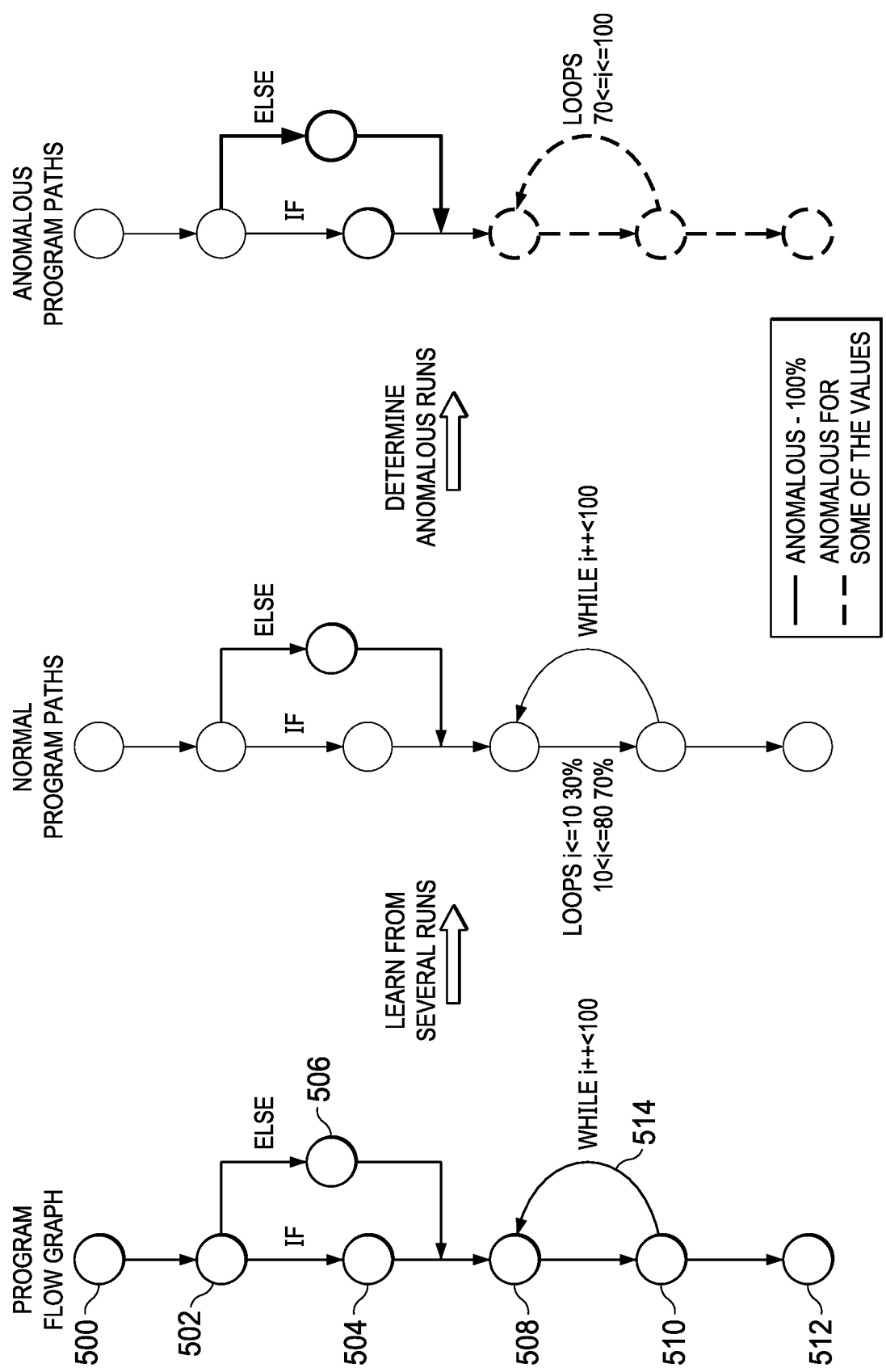
FIG. 5 depicts a representative application program control flow graph depicting how the technique of this disclosure is used to identify normal program paths and anomalous program paths.

FIG. 5 depicts an example program control flow graph that is generated in step 402 as described above. The program control flow graph (as represented on the left) comprises the elements or code blocks (functions, operations, etc.) 500, 502, 504, 506, 508, 510 and 512, where element 502 is an operation whose output branches between elements 504 and 506. A loop 514 extends from element 510 back to element 508. The normal program paths (as represented in the middle) are determined following several runs and determine that the loop 514 is invoked 30% of the time when a count is 10, and 70% when the count is between 10 and 80 (these numbers being merely exemplary). During graph analysis, and as represented on the right, it is determined that the loop 514 is invoked with counts between 70 and 100. As such, the path 508, 510 and 512 is determined to be anomalous for some of the values, and anomalous for all count values when the loop is encountered following an execution path that includes elements 502 and 506.

As the above example illustrates, the notion of an "anomaly" with respect to a particular control flow and/or data flow will depend on the program elements at issue, their logic flow, and other factors. As used herein, an "anomaly" then carries its usual meaning of something (in this case, a control flow, a data flow, or some combination thereof) that deviates from what is standard, normal, or expected for such flow(s).

The technique of this disclosure provides significant advantages. Using basic instrumentation and data collection, the system is readily trained about normal versus anomalous paths, and sensitive paths versus non-sensitive paths, with respect to an application being evaluated. Based on this initial learning, the approach herein enables rapid and accurate determination of control flow or data flow anomalies in the application program as such program executes within an execution environment in which one or more security or compliance policies, such as security policies, compliance policies, and the like, are desired or needed to be enforced. Graph analysis (e.g., using an analytics engine) carried out against a provenance graph determines anomalous nodes and edges. The approach herein facilitates further downstream activities, such as auditing, forensic analysis, mitigation, remediation, notification, and the like. With the information learned from this approach, the application program can be further protected against attacks.

This subject matter may be implemented as-a-service. As previously noted, and without limitation, the subject matter may be implemented within or in association with a cloud platform system or appliance. The machine learning (ML) functionality may be provided as a standalone function, or it may leverage functionality from other ML-based products and services.

A representative cloud application platform with which policy-based control and data flow path anomaly detection service may be implemented includes, without limitation, any cloud-supported application security testing framework, product or service.

More generally, the approach herein provides for mining, learning and modeling normal application program behavior so that attempts to compromise that behavior can be identified and addressed.

The nature of the corrective action that may be taken with respect to detection of an application program control or data flow anomaly is not an aspect of the described methodology, and any known or later-developed technologies and systems may be used for this purpose.

One of ordinary skill in the art will further appreciate that the technique herein automates the time-consuming and often difficult research and investigation process that has heretofore been the province of the security analyst. The approach retrieves knowledge about the IOCs using a knowledge graph preferably extracted from public and/or private structured and unstructured data sources, and then extends that knowledge even further, thereby greatly reducing the time necessary for the analyst to determine cause and effect.

The approach herein is designed to be implemented in an automated manner within or in association with a security system, such as a SIEM.

The provenance graph may be a component of the system, or such a graph may be used by the system.

The functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

As noted, the technique described herein may be implemented in or in conjunction with various server-side architectures including simple n-tier architectures, web portals, federated systems, cloud environments, and the like.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the identity context-based access control functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the graph generation and analysis techniques are implemented in a special purpose computer, preferably in software executed by one or more processors. The software is maintained in one or more data stores or memories associated with the one or more processors, and the software may be implemented as one or more computer programs. Collectively, this special-purpose hardware and software comprises the functionality described above.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The techniques herein provide for improvements to another technology or technical field, namely, security incident and event management (SIEM) systems, as well as improvements to automation-based graph-based analytics. The techniques herein also generally improve computing functioning by providing provisioning, detection, monitoring and analysis of attacks as they occur in computing systems more efficiently and without the significant overhead required of current state-of-the art approaches. Computing systems that incorporate the techniques herein provide these advantages transparently and without disruption of application workflow, thereby increasing the reliability and availability of the underlying computer system. Computer systems implemented with the approach herein operate more efficiently and with less cyber security-specific processing and storage requirements than they would otherwise.

A graph as described herein may be rendered for visual display, e.g., to an analyst, to facilitate the follow-on analysis or action.

Having described our invention, what we claim is as follows.

The invention claimed is:

1. A method of detecting anomalous behavior of an application program, comprising:
   receiving trace data comprising instruction-level traces generated from multiple invocations of the application program, the instruction-level traces comprising control flow information for the application program;
   based at least in part on the received trace data, building a baseline provenance graph generated at least in part by supervised machine learning incorporating a plurality of rounds of training, wherein the baseline provenance graph models a normal control flow or data flow in the application program, the baseline provenance graph comprising a plurality of edges or paths;
   based at least in part on the baseline provenance graph, classifying at least one of the plurality of edges or paths associated with a control flow or data flow of the application program represented by the baseline provenance graph as a sensitive edge or path involving sensitive data or computation and at least one of the plurality of edges or paths associated with the control flow or data flow of the application program represented by the baseline provenance graph as a non-sensitive edge or path that does not involve sensitive data or computation;
   during runtime execution of the application program against a policy, receiving log data;
   using the received log data to assign confidence values to at least one of the control or data flows with respect to the policy;
   identifying, from the assigned confidence values, one or more anomalous edges or paths of the plurality of edges or paths with respect to the policy, the anomalous edges or paths representing the anomalous behavior; and
   responsive to detecting that the anomalous behavior occurs within the sensitive edge or path, taking a further corrective action.

2. The method as described in claim 1 further including building a program execution provenance graph associated with the policy and that includes the control or data flows and their assigned confidence values.

3. The method as described in claim 2 wherein the program execution provenance graph is built using machine learning.

4. The method as described in claim 3 further including adjusting a confidence value assigned to a given control or data flow based on the machine learning.

5. The method as described in claim 1 wherein the baseline provenance graph comprises a control flow graph, and a data flow graph.

6. The method as described in claim 1 wherein the policy is one of: a security policy, and a compliance policy.

7. The method as described in claim 2 further including reporting an application program behavior anomaly identified from the program execution provenance graph.

8. An apparatus for detecting anomalous behavior of an application program, comprising:
   a processor;
   computer memory holding computer program instructions executed by the processor, the computer program instructions configured to:

receive trace data comprising instruction-level traces generated from multiple invocations of the application program, the instruction-level traces comprising control flow information for the application program;

based at least in part on the received trace data, build a baseline provenance graph generated at least in part by supervised machine learning incorporating a plurality of rounds of training, wherein the baseline provenance graph models a normal control flow or data flow in the application program, the baseline provenance graph comprising a plurality of edges or paths;

based at least in part on the baseline provenance graph, classify at least one of the plurality of edges or paths associated with a control flow or data flow of the application program represented by the baseline provenance graph as a sensitive edge or path involving sensitive data or computation and at least one of the plurality of edges or paths associated with the control flow or data flow of the application program represented by the baseline provenance graph as a non-sensitive edge or path that does not involve sensitive data or computation;

during runtime execution of the application program against a policy, receive log data;

use the received log data to assign confidence values to at least one of the control or data flows with respect to the policy;

identify from the assigned confidence values one or more anomalous edges or paths of the plurality of edges or paths with respect to the policy, the anomalous edges or paths representing the anomalous behavior; and responsive to detecting that the anomalous behavior occurs within the sensitive edge or path, take a further corrective action.

9. The apparatus as described in claim 8 wherein the computer program instructions are further configured to build a program execution provenance graph associated with the policy and that includes the control or data flows and their assigned confidence values.

10. The apparatus as described in claim 9 wherein the program execution provenance graph is built using machine learning.

11. The apparatus as described in claim 10 wherein the computer program instructions are further configured to adjust a confidence value assigned to a given control or data flow based on the machine learning.

12. The apparatus as described in claim 8 wherein the baseline provenance graph comprises a control flow graph, and a data flow graph.

13. The apparatus as described in claim 8 wherein the policy is one of: a security policy, and a compliance policy.

14. The apparatus as described in claim 9 wherein the computer program instructions are further configured to report an application program behavior anomaly identified from the program execution provenance graph.

15. A computer program product in a non-transitory computer readable medium for use in a data processing system for detecting anomalous behavior of an application program the computer program product holding computer program instructions that, when executed by the data processing system, are configured to:

receive trace data comprising instruction-level traces generated from multiple invocations of the application program, the instruction-level traces comprising control flow information for the application program;

based at least in part on the received trace data, build a baseline provenance graph generated at least in part by supervised machine learning incorporating a plurality of rounds of training, wherein the baseline provenance graph models a normal control flow or data flow in the application program, the baseline provenance graph comprising a plurality of edges or paths;

based at least in part on the baseline provenance graph, classify at least one of the plurality of edges or paths associated with a control flow or data flow of the application program represented by the baseline provenance graph as a sensitive edge or path involving sensitive data or computation and at least one of the plurality of edges or paths associated with the control flow or data flow of the application program represented by the baseline provenance graph as a non-sensitive edge or path that does not involve sensitive data or computation;

during runtime execution of the application program against a policy, receive log data; and use the received log data to assign confidence values to at least one of the control or data flows with respect to the policy;

identify from the assigned confidence values one or more anomalous edges or paths of the plurality of edges or paths with respect to the policy, the anomalous edges or paths representing the anomalous behavior; and responsive to detecting that the anomalous behavior occurs within the sensitive edge or path, take a further corrective action.

16. The computer program product as described in claim 15 wherein the computer program instructions are further configured to build a program execution provenance graph associated with the policy and that includes the control or data flows and their assigned confidence values.

17. The computer program product as described in claim 16 wherein the program execution provenance graph is built using machine learning.

18. The computer program product as described in claim 17 wherein the computer program instructions are further configured to adjust a confidence value assigned to a given control or data flow based on the machine learning.

19. The computer program product as described in claim 15 wherein the baseline provenance graph comprises a control flow graph, and a data flow graph.

20. The computer program product as described in claim 15 wherein the policy is one of: a security policy, and a compliance policy.

21. The computer program product as described in claim 16 wherein the computer program instructions are further configured to report an application program behavior anomaly identified from the program execution provenance graph.

* * * * *